(No Model.)

F. HULSE.
WEEDER.

No. 470,133. Patented Mar. 1, 1892.

WITNESSES:
F. M. Ardle.
C. Sedgwick

INVENTOR
F. Hulse
BY Munn & Co.
ATTORNEYS

THE NORRIS PETERS CO., PHOTO-LITHO., WASHINGTON, D. C.

UNITED STATES PATENT OFFICE.

FRANK HULSE, OF GOSHEN, NEW YORK.

WEEDER.

SPECIFICATION forming part of Letters Patent No. 470,133, dated March 1, 1892.

Application filed September 11, 1891. Serial No. 405,372. (No model.)

*To all whom it may concern:*

Be it known that I, FRANK HULSE, of Goshen, in the county of Orange and State of New York, have invented a new and Improved Weeder, of which the following is a full, clear, and exact description.

My invention relates to improvements in weeding-machines; and the object of my invention is to produce a simple machine which will take the place of hand-work, which machine may be pushed along the ground over a row of plants and will pull the weeds from between the plants, thoroughly stirring the soil and without injury to the plants.

To this end my invention consists in certain features of construction and combinations of parts, which will be hereinafter described and claimed.

Reference is to be had to the accompanying drawings, forming a part of this specification, in which similar figures of reference indicate corresponding parts in all the views.

Figure 1:
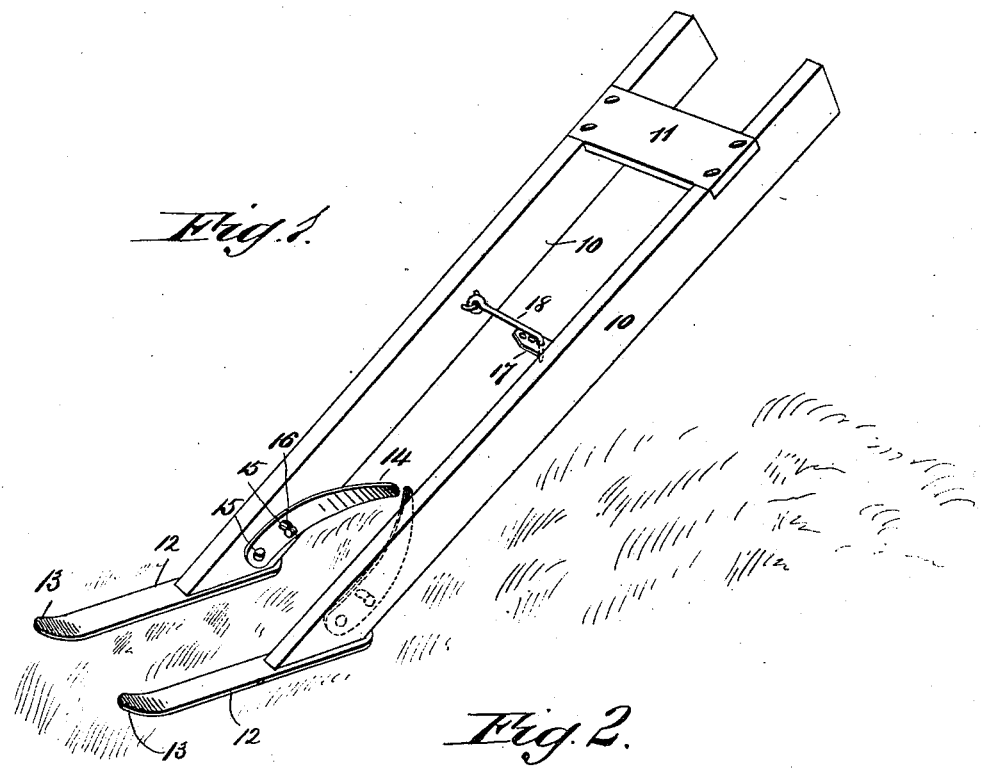
Figure 2:
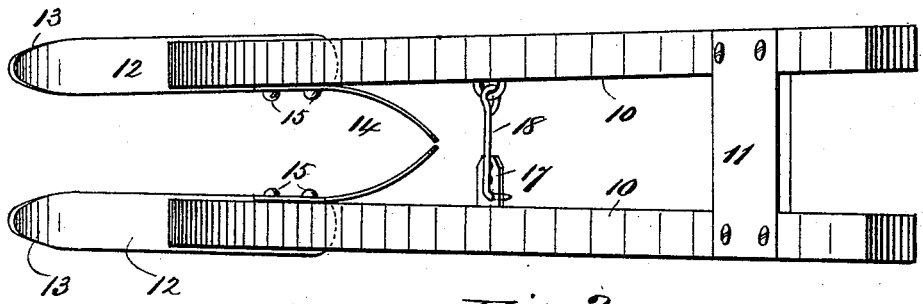
Figure 3:
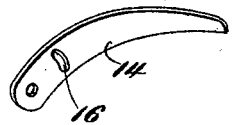

Figure 1 is a perspective view of the machine embodying my invention. Fig. 2 is a plan view of the same, and Fig. 3 is a detail perspective view of one of the spring weeder-fingers.

The machine is provided with two parallel bars 10, which are united near the top by a cross-piece 11, and which form the handle of the machine, the bars being long enough so that a person may grasp them near the top while in an erect position and have the feet of them extend to the ground. The bars 10 rest upon shoes 12, which are adapted to run upon the ground, and the shoes have their front ends turned up slightly, as shown at 13, so that they may ride over any small obstruction. The bars are cut off diagonally at points where they are secured to the shoes, so that when the shoes rest flatwise upon the soil the bars will extend backward at a convenient angle. Between the bars are converging spring-fingers 14, one finger being secured to each bar, and the fingers are arranged so that their points will nearly touch, the exact arrangement depending upon the size of the weeds to be pulled and the size of the plants over which the machine is to run. These fingers are secured to the bars by screws 15, and to provide for the vertical adjustment of the fingers each finger is provided with a transverse slot 16, which receives one of the attaching-screws. The bars are united near the center by a perforated ear 17, which is secured to one bar, and a hook 18, which is pivoted to the opposite bar and is adapted to enter a perforation in the ear. The hook and ear provide for adjusting the bars in relation to each other, so that they may be held a desired distance apart, and, while the bars are rigidly united at the top, still there will be sufficient spring to them so that they may be moved in relation to one another at their lower ends.

The operation of the machine is as follows: The machine is pushed straddle of a row of plants by the operator, and is preferably used when the weeds have just started. The pressure of the fingers 14 will cause the weeds to be nipped between the free ends of the fingers, thus pulling up the weeds and stirring the soil, and as the plants are usually larger than the weeds and have a stronger root the fingers will spring apart and pass the plants without injuring them.

Having thus described my invention, I claim as new and desire to secure by Letters Patent—

1. A weeder comprising handle-bars, shoes secured to the lower ends of the bars, and converging spring-fingers arranged between the bars and supported thereon, substantially as described.

2. A weeder comprising handle-bars, shoes secured to the lower ends of the bars and adapted to run upon the ground, converging spring-fingers arranged between the handle-bars and supported thereon, and means for adjusting the handle-bars laterally in relation to each other, substantially as described.

3. The combination, with the handle-bars having shoes at their lower ends, of the converging spring-fingers arranged between the handle-bars and secured thereto, the fingers having means for vertical adjustment, substantially as described.

FRANK HULSE.

Witnesses:
 JOHN WALLACE,
 CHARLES G. ELLIOTT.